(12) United States Patent
Henderson et al.

(10) Patent No.: US 6,669,760 B1
(45) Date of Patent: Dec. 30, 2003

(54) SEPARATION OF $C_2F_6$ FROM $CF_4$ BY ADSORPTION ON ACTIVATED CARBON

(75) Inventors: Philip Bruce Henderson, Allentown, PA (US); Timothy Christopher Golden, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/409,230

(22) Filed: Apr. 8, 2003

(51) Int. Cl.[7] ............................................. B01D 53/04
(52) U.S. Cl. .............................. 95/131; 95/97; 95/142; 95/901
(58) Field of Search .................... 95/96–106, 114, 95/15, 131, 141, 142, 901

(56) References Cited

U.S. PATENT DOCUMENTS

| | | | | |
|---|---|---|---|---|
| 4,820,318 A | * | 4/1989 | Chang et al. .................. | 95/141 |
| 5,206,207 A | * | 4/1993 | Tolles .......................... | 502/424 |
| 5,421,860 A | * | 6/1995 | Bretz et al. ................... | 95/115 |
| 5,523,499 A | | 6/1996 | Corbin et al. ................. | 570/179 |
| 5,710,092 A | * | 1/1998 | Baker .......................... | 502/416 |
| 5,814,127 A | * | 9/1998 | Li ................................. | 95/47 |
| 5,976,222 A | * | 11/1999 | Yang et al. .................... | 95/45 |
| 6,017,382 A | * | 1/2000 | Ji et al. ........................ | 95/103 |
| 6,187,077 B1 | | 2/2001 | Li ................................. | 95/47 |
| 6,224,677 B1 | * | 5/2001 | Nozawa et al. .............. | 118/715 |

FOREIGN PATENT DOCUMENTS

JP     54-62867     5/1979

\* cited by examiner

*Primary Examiner*—Robert H. Spitzer
(74) *Attorney, Agent, or Firm*—Geoffrey L. Chase

(57) ABSTRACT

This invention relates to an improvement in a process for removing $C_2F_6$ as an impurity from a $CF_4$ containing gas, preferably $CF_4$ produced by the reaction of $F_2$ with carbon. The improvement in the process comprises the steps:

- contacting the $CF_4$ containing gas, containing $C_2F_6$ impurity, with an activated carbon having a $CCl_4$ activity from 43 to 55 in an adsorption bed to effect adsorption of the $C_2F_6$ impurity; and,
- recovering purified $CF_4$ product in the effluent from the adsorbent bed.

10 Claims, 1 Drawing Sheet

SEPARATION OF $C_2F_6$ FROM $CF_4$ BY ADSORPTION ON ACTIVATED CARBON

BACKGROUND OF THE INVENTION

Historically, high purity $CF_4$, which is used to etch silica in the manufacture of integrated circuits, has been derived by the direct fluorination of carbon. Purification of the $CF_4$ gas formed, which includes the removal of impurities such as $C_2F_6$, has been effected by temperature swing adsorption using a zeolite bed, such as, NaX (13X). $CF_4$ is co-adsorbed with the $C_2F_6$ impurity on the 13X zeolite. When the bed is saturated with $C_2F_6$, a $N_2$ purge is passed through the spent adsorbent bed in order to recover some of the coadsorbed $CF_4$ from the bed. The $CF_4$, which is less strongly adsorbed than the $C_2F_6$, desorbs first into the $N_2$ purge gas and then the $C_2F_6$ is desorbed. The $N_2$ purge gas containing desorbed $CF_4$, and small amounts of desorbed $C_2F_6$, is passed through a second bed of 13X zeolite until the $C_2F_6$ concentration in the effluent rises to an unacceptable level in the $CF_4/N_2$ mixture. By this process about half of the co-adsorbed $CF_4$ can be recovered before the $C_2F_6$ concentration in the effluent becomes too high.

Representative patents relating to the separation of carbon fluoride gases are as follows:

U.S. Pat. No. 6,187,077 discloses a process for separating at least one of $CF_4$ and $C_2F_6$ from a gas containing at least one of $NF_3$, $CHF_3$ and $N_2$ and $SF_6$. The process steps include 1) passing a feed stream containing various impurities through a glassy membrane to produce a retentate stream rich in $SF_6$ and at least one of $CF_4$ and $C_2F_6$, and, then 2) contacting the retentate stream with an adsorbent effective to adsorb $SF_6$ and produce a product stream rich in at least one of $CF_4$ and $C_2F_6$. Representative adsorbents include zeolites, preferably X types, activated carbons, e.g., BPL, (data sheet indicates a $CCl_4$ activity of 60–65), PCB (data sheet indicates a $CCl_4$ activity of 60), BAC, F-300, F-400, BPL, RB2 (data sheet indicates an activity of 65) with PCB being the preferred activated carbon. Polymeric adsorbent resins, and carbon molecular sieves are also disclosed.

U.S. Pat. No. 5,523,499 discloses a process for the purification of $C_2F_6$ contaminated with $CClF_3$ and $CHF_3$ impurities by adsorption. The $C_2F_6$ gas contaminated with impurities is contacted with a sorbent which includes zeolite molecular sieves and activated carbons. Preferred activated carbons, such as BPL from the Calgon Corporation and Type UU from Barneby and Sutcliffe Corp having a particle size of from 4 to 325 mesh.

Japanese Patent Application No. 54-62867 (disclosure 55-154925) discloses a purification process for $CF_4$ containing $CF_3Cl$ as an impurity. The process comprises the steps of irradiating the gas stream with a laser and absorbing photons in the fluorine compounds thereby converting the $CF_3Cl$ to $C_2F_6$ and $Cl_2$. The $C_2F_6$ is then removed via distillation or adsorption.

There is a need in the industry for adsorbents that would allow for a long onstream time for a given column size and a need for adsorbents which have a higher selectivity for carbon fluoride impurities other than the $CF_4$ product. Such improved adsorbents would enhance the recovery of $CF_4$.

BRIEF SUMMARY OF THE INVENTION

This invention relates to an improvement in a process for removing $C_2F_6$ as an impurity from a $CF_4$ containing gas, preferably $CF_4$ produced by the reaction of $F_2$ with carbon. The improvement in the process comprises the steps:

contacting said $CF_4$ containing gas with an activated carbon having a $CCl_4$ activity from 43 to 55 in an adsorption bed to effect selective adsorption of said $C_2F_6$ impurity; and, recovering a purified $CF_4$ product in the effluent from said adsorbent bed.

Significant advantages of this process include:

an ability to remove impurities from a $CF_4$ containing gas stream contaminated with fluorocarbon impurities;

an ability to selectively adsorb contaminant $C_2F_6$ without effecting substantial losses to irreversible adsorption of $CF_4$;

an ability to provide for long onstream times in the adsorption process; and, an ability to achieve effective removal of the fluorocarbon impurities from the $CF_4$ product.

DETAILED DESCRIPTION OF THE INVENTION

Figure 1:
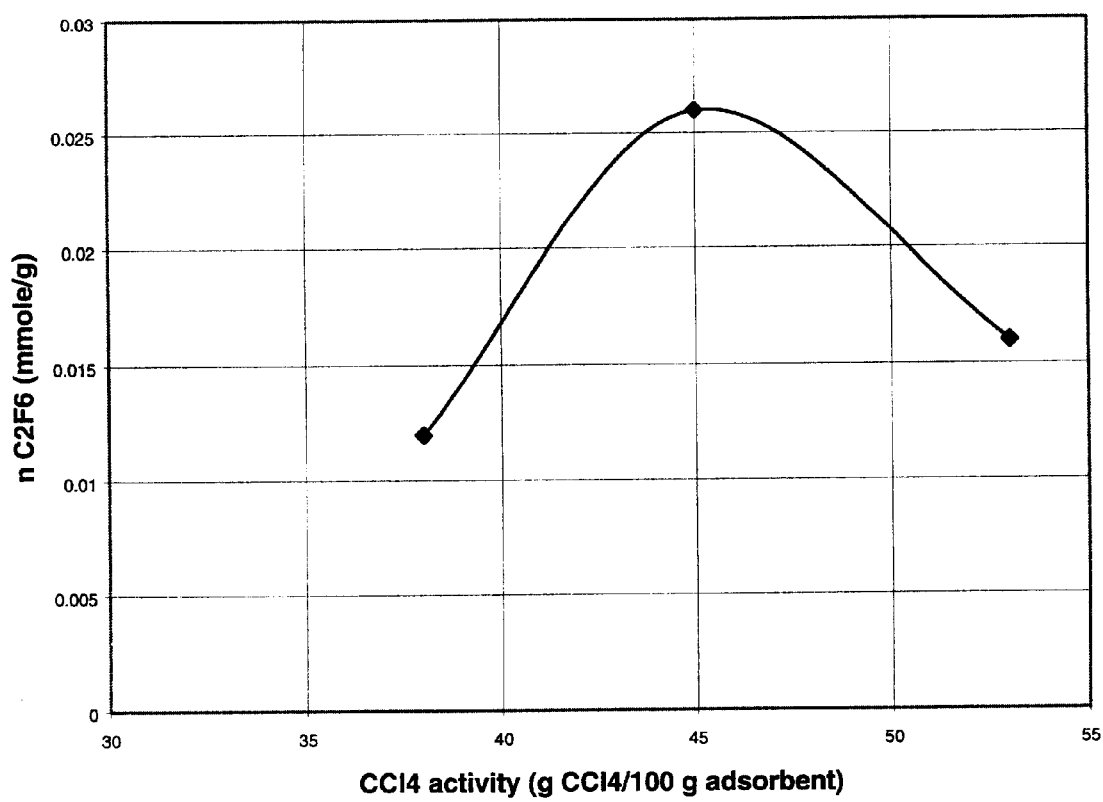
FIG. 1 is a graph of $C_2F_6$ adsorption on activated carbon versus the $CCl_4$ activity of such activated carbon adsorbents.

Carbon tetrafluoride is produced by direct fluorination of carbon. In that process a reaction product is generated which contains many impurities which must be removed. Various impurities in the reaction product include unreacted fluorine, HF, $SF_6$, and carbon fluorides, such as, $CHF_3$ and $C_2F_6$. The impurity $C_2F_6$ is generated from the incomplete reaction of carbon with $F_2$. Typical $CF_4$ feed gas concentrations have from 500 to 5000 ppm $C_2F_6$ in $CF_4$ and the $C_2F_6$ must be reduced to less than 0.5 ppm for commercial high purity $CF_4$.

Removal of contaminant $C_2F_6$ from a $CF_4$ gas stream to produce commercial high purity $CF_4$ is achieved by contacting the gas stream with an activated carbon having a carbon tetrachloride activity coefficient of from 43 to 55. If the binding power of the activated carbon is below a $CCl_4$ activity of 43, then some of the $C_2F_6$ may pass through and contaminate the $CF_4$ product. If higher than 55, the binding power of the activated carbon is too high and $CF_4$ product may be irreversibly retained within the adsorbent bed of activated carbon. This level of activity allows for $C_2F_6$ adsorption capacities of 0.15 millimoles $C_2F_6$/gram activated carbon (mmole $C_2F_6$/gram), preferably at least 0.02 and most preferably at least 0.025 mm$C_2F_6$/gram activated carbon at a temperature from 25 to 30° C.

The carbon tetrachloride activity of an adsorbent is a standard measurement (ASTM test method D3467-99) that measures the gravimetric saturation capacity of the adsorbent. Carbon tetrachloride ($CCl_4$) activity is defined herein as the ratio (in percent) of the weight of $CCl_4$ adsorbed by an activated carbon sample to the weight of the sample, when the carbon is saturated with $CCl_4$ under conditions listed in this ASTM test method and is incorporated by reference. Recently, the use of $CCl_4$ activity has been replaced by characterization of the adsorption of butane on the adsorbent. Butane activity is equivalent to $CCl_4$ activity and is equated to $CCl_4$ activity per the equation:

$$\text{Butane activity} = CCl_4 \text{ activity}/2.52$$

Thus, a corresponding $CCl_4$ activity can be obtained by multiplying the butane activity of the adsorbent by 2.52.

The activated carbon suited for use in removing the impurity $C_2F_6$ typically has a particle size range of 0.5 to 3 mm in diameter.

Inlet feed temperatures to the adsorption bed range from 0 to 100° C. and inlet feed pressures to the adsorption bed range from 1 to 20 atm absolute. Preferred operation temperatures range from 20 to 50° C. and pressures from 2 to 10 atm.

Regeneration of the spent carbon bed for reuse can be effected in accordance with generally accepted procedures. Desorption can be achieved at pressures from 0.1 to 2 atm absolute and temperatures from 50 to 300° C. Accordingly, the process lends itself to both a thermal swing and pressure swing adsorption/desorption process. Regeneration of the bed using thermal swing adsorption allows for the use of nonreactive gases as a purge. These gases include $N_2$, Ar, He, $H_2$ and mixtures thereof.

Although adsorbents having a carbon tetrachloride adsorption capacity of between 43 and 55 are perferentially selective for $C_2F_6$ than $CF_4$, some loses of $CF_4$ occur in adsorption. Modest recovery of $CF_4$ adsorbed by the activated carbon in the adsorption bed can be achieved by passing a purge gas through the spent carbon bed. $CF_4$ is desorbed into the purge gas in preference to $C_2F_6$. To remove residual $C_2F_6$ from the purge gas, the purge gas from the spent gas is passed through a fresh bed of activated carbon wherein the residual $C_2F_6$ is adsorbed. Enhanced recovery of $CF_4$ is achieved. Multiple beds with pressure equalization steps can be used to improve recovery.

The following examples are provided to illustrate preferred embodiments of the invention and are not intended to restrict the scope thereof.

EXAMPLE 1

Selective Adsorption of $CF_4$ on Activated Carbon

To determine the effectiveness of various activated carbons for removal of $C_2F_6$ from $CF_4$, 198 g of Pacific Activated Carbon ($CCl_4$ activity is 45) were packed into a 1" diameter column with a length of 3 feet or approximately 1 meter. Feed $CF_4$ gases were passed through the column and the effluent from the column was analyzed for percent concentration of $CF_4$ and the concentration of $C_2F_6$ in ppm by gas chromatography (GC).

Initially, the column filled with Pacific Activated Carbon ($CCl_4$ activity 45) was saturated with $CF_4$ and allowed to come to a constant temperature. Then, a gas mixture containing 1000 ppm of $C_2F_6$ and 300 ppm $SF_6$ in $CF_4$ was flowed through the column operating at atmospheric pressure and a temperature of 25 to 30° C. through at 100 sccm. The effluent from the column was analyzed every 3 minutes until there was a breakthrough. The breakthrough time was defined as the time 3 ppm of $C_2F_6$ was detected in the effluent by GC. After 20.0 hours of operation, $C_2F_6$ breakthrough was observed. This corresponds to a $C_2F_6$ capacity of the Pacific Activated Carbon of 0.026 mmole $C_2F_6$/g at breakthrough.

EXAMPLE 2

Selective Desorption of $CF_4$ from Activated Carbon

Directly after breakthrough of the $C_2F_6$ in Example 1, the feed gas was switched to a flow of 100 sccm $N_2$ to effect desorption of the bed. The column was operated at ambient temperature during desorption. During initial desorption of the $CF_4$ from the activated carbon bed, the impurity level in the purge gas remained constant at 40 ppm of $C_2F_6$. After purging for 106 minutes the $CF_4$ concentration in the $N_2$ dropped below 10% and desorption was stopped.

The desorbed $CF_4$ in the $N_2$ could be recovered by conventional means, e.g., by passing the $CF_4/N_2$ mixture through a second activated carbon column to remove the $C_2F_6$ and cryogenically separating from the purge $N_2$.

EXAMPLE 3

Selective Adsorption of $CF_4$ with 13X Zeolite

The procedure of Example 1 was repeated except 278 g of 13X ($CCl_4$ activity 38) was used as the adsorbent in place of the Pacific Activated Carbon. A $CF_4$ feed gas contaminated with both $SF_6$ and $C_2F_6$ was used and breakthroughs were observed after 13.0 hours. This corresponds to a $C_2F_6$ capacity of 0.012 mmole/g.

EXAMPLE 4

Recovery of $CF_4$ from 13X Zeolite

A $CF_4$ recovery experiment similar to Example 2 was performed on the column employed in Example 3. Nitrogen was passed through the bed and after 60 minutes the $CF_4$ concentration in the $N_2$ dropped below 10%. Desorption was stopped at that point. The $C_2F_6$ concentration in the nitrogen was observed at 60 ppm and steadily rose to 285 ppm at the end of the desorption step for the recovery of $CF_4$.

EXAMPLE 5

Adsorption of $CF_4$ on Activated Carbon

The procedure of Example 1 was repeated except for the use of a different activated carbon. A breakthrough experiment was conducted under the same conditions with Barneby-Sutcliffe type 205A activated carbon adsorbent having a $CCl_4$ activity of 53. The $C_2F_6$ capacity determined from the breakthrough curve was 0.016 mmole/g. The active density of the type 205A carbon is essentially the same as that for the Pacific activated carbon (0.5 g/cc).

EXAMPLE 6

Plot of $C_2F_6$ Capacity Verses $CCl_4$ Activity

A plot of $C_2H_6$ adsorption in mm/gram activated carbon versus $CCl_4$ activity of the activated carbon was prepared based upon the results of the above examples is set forth in FIG. 1.

The results in the plot show a surprising result. The $C_2F_6$ capacity of the absorbents goes through a desirable range where the activity is at least 43 to 55 with a preferred range of from 44 to 50 with a maximum $CCl_4$ activity at about 45. This is an unexpected result since one would expect the higher the saturation capacity of the adsorbent, the higher the $C_2F_6$ capacity. From the data, activated carbons having a high capacity for $C_2F_6$ do not have the same high capacity for $CF_4$. Activity levels of 0.015 and preferably from about 0.02 to about 0.03 mmole $C_2F_6$/gram activated carbon allow for $CF_4$ to pass through in the effluent and allow for significant levels of recovery by purging from the activated carbon without substantial contamination from the $C_2F_6$.

Summarizing from the examples above, it is clear that the Pacific Activated Carbon having a $CCl_4$ activity of 45 outperformed both the zeolite 13X which had a $CCl_4$ activity of 38 and the Barneby-Sutcliffe activated carbon which had a $CCl_4$ activity of 53. However, the Barneby-Sutcliffe activated carbon has sufficient activity for removing $C_2F_6$ for some applications. Comparing Examples 1 and 3, the Pacific Activated Carbon is shown to have more than twice the capacity for $C_2F_6$ compared to 13X on a mmole/g basis. Also, due to the differences in packing densities, activated carbon allows for on-stream times >50% longer for removing $C_2F_6$ from $CF_4$ than 13X. Moreover, these activated carbons adsorb the residual impurity, $SF_6$, much more strongly than does 13X.

Another feature of the use of activated carbon having an activity between 43 and 55 is noted in the comparison of Examples 2 and 4. These examples show that recovery of $CF_4$ at ambient temperature using a $N_2$ purge can be achieved. There is $C_2F_6$ and essentially no $SF_6$ desorbed in the purge gas when an activated carbon having a $CCl_4$ activity between 43 and 55 is used versus 13X.

The examples also show that the presence of low levels of $SF_6$ in the feed does not adversely affect the measured capacity of $C_2F_6$ in Examples 1 or 5.

The present invention has been described with several preferred embodiments, but the full scope of the invention should be ascertained from the claims which follow.

What is claimed is:

1. In a process for removing $C_2F_6$ as an impurity from a $CF_4$ containing gas, wherein the $CF_4$ containing gas is contacted with an adsorbent in an adsorbent bed for selectively adsorbing $C_2F_6$, and the $CF_4$ is recovered in the effluent from the adsorbent bed, the improvement which comprises the steps:

contacting said $CF_4$ containing gas, containing $C_2F_6$ impurity, with an adsorbent comprised of an activated carbon having a $CCl_4$ activity from 43 to 55 in an adsorption bed to effect adsorption of said $C_2F_6$ impurity; and, recovering a purified $CF_4$ product in the effluent from said adsorbent bed.

2. The process of claim 1 wherein the $CF_4$ containing gas has from about 500 to 5000 ppm $C_2F_6$ as an impurity.

3. The process of claim 2 wherein the activated carbon has a particle size of from 0.5 to 3 mm diameter.

4. The process of claim 3 wherein the adsorbent bed is operated at a temperature from 0 to 100° C. and inlet feed pressures to the adsorption bed range from 1 to 20 atm absolute.

5. The process of claim 2 wherein enhanced recovery of $CF_4$ is achieved by passing a purge gas through the bed to selectively desorb $CF_4$ from the bed prior to desorption of $C_2F_6$.

6. The process of claim 5 wherein the purge gas is nitrogen.

7. The process of claim 6 wherein $CF_4$ retained in the adsorption bed is desorbed at a pressure from 0.1 to 2 atmospheres and a temperature from 50 to 300° C.

8. In a process for removing $C_2F_6$ as an impurity from a $CF_4$ containing gas, wherein the $CF_4$ containing gas is contacted with an adsorbent in an adsorbent bed for selectively adsorbing $C_2F_6$, and the $CF_4$ is recovered in the effluent from the adsorbent bed, the improvement which comprises the steps:

contacting said $CF_4$ containing gas, containing $C_2F_6$ impurity, with an activated carbon having a capacity for $C_2F_6$ of at least 0.015 millimoles $C_2F_6$ per gram of activated carbon in an adsorption bed at a temperature from 25 to 30° C. to effect adsorption of said $C_2F_6$ impurity; and, recovering a purified $CF_4$ product in the effluent from said adsorbent bed.

9. The process of claim 8 wherein the $CF_4$ containing gas has from about 500 to 5000 ppm $C_2F_6$ as an impurity.

10. The process of claim 8 wherein the activated carbon has a capacity for $C_2F_6$ of at least 0.02 to 0.03 millimoles $C_2F_6$ per gram of activated carbon.

* * * * *